UNITED STATES PATENT OFFICE.

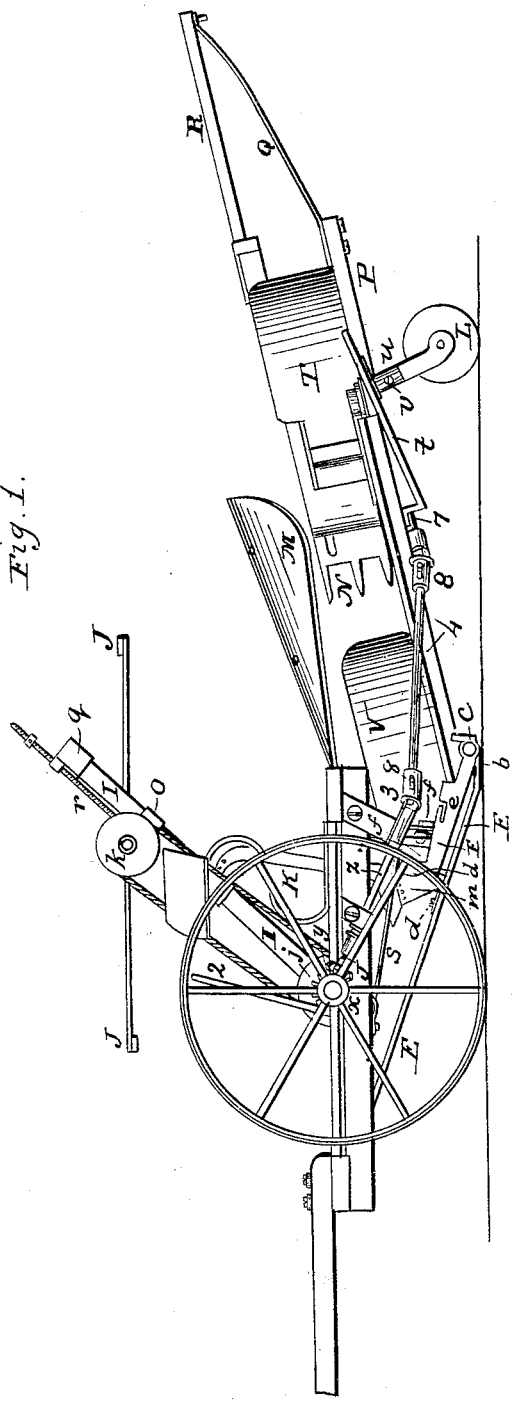

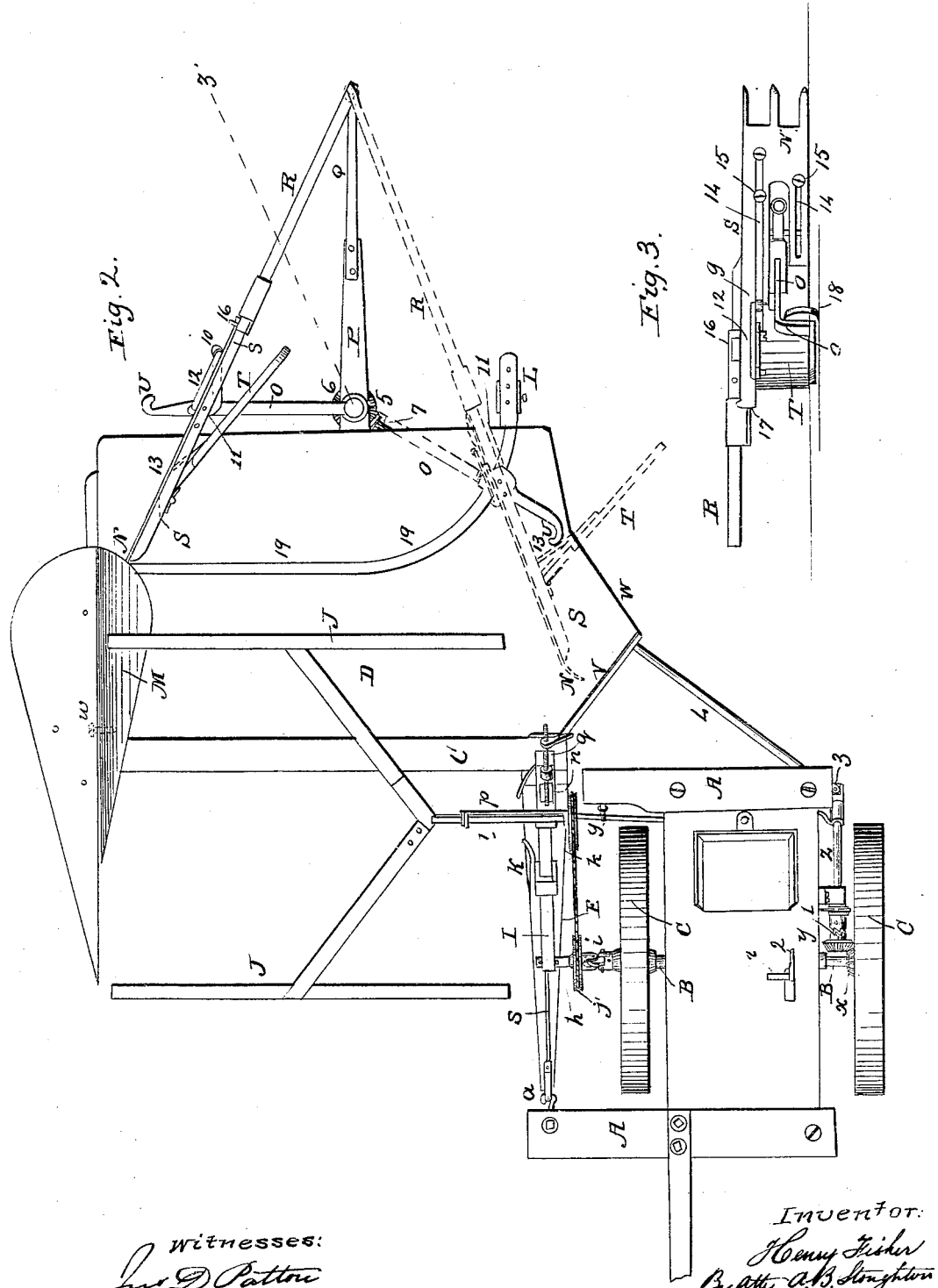

HENRY FISHER, OF CANTON, OHIO, ASSIGNOR TO C. AULTMAN & CO., OF SAME PLACE.

IMPROVEMENT IN RAKE ATTACHMENTS TO HARVESTERS.

Specification forming part of Letters Patent No. 51,111, dated November 21, 1865.

*To all whom it may concern:*

Be it known that I, HENRY FISHER, of Canton, in the county of Stark and State of Ohio, have invented a new and useful Improvement in Self-Rakers for Harvesting-Machines; and I do hereby declare the following to be a full, clear, and exact description of the same, reference being had to the accompanying drawings, making a part of this specification, in which—

Figure 1 represents a side elevation taken from the stubble side of the machine. Fig. 2 represents a top plan thereof, wherein the rake, in its most contracted form, is shown in black lines, and its most elongated form is shown in red lines, the two positions being at opposite sides of the platform or grain-table. Fig. 3 represents a rear view of the rake, rake-head, and its appliances, a front view of it being seen in Fig. 1.

Similar letters of reference, where they occur in the drawings, denote like parts of the machine in all the separate figures.

My invention relates to a self-acting raking apparatus arranged upon a hinged and separately-yielding platform and driven from the gear of the main frame, and having a variable line of sweep or motion, so as to traverse the platform to sweep the grain therefrom and aid in forming a gavel upon the platform before it is delivered onto the ground, as will be explained.

To enable others skilled in the art to make and use my invention, I will proceed to describe the same with reference to the drawings.

A represents the main frame of the machine, resting upon an axle, B, that is mounted in or on wheels C, one of which shall be a driving-wheel, and fast on, so as to turn with, the axle.

The platform or grain-table D is connected to the main frame by hinged, jointed, or yielding coupling-arms, so that it may yield to the inequalities of the ground over which it passes, as follows: The bar E extends from the platform or finger-bar forward and upward, and is hinged at $a$ to the front right-hand corner of the main frame. In rear of the line of the finger-bar this coupling-bar E is turned upward runner fashion, as at $b$, and at the point $c$ thereon is hinged a shoe or arm, F, the forward end of which is guided in its vertically-vibrating motion by a bracket, $d$, having a slot in it for the point of the shoe or arm to move in, said bracket being on the coupling arm or bar E. The finger or platform bar G is fastened to the shoe or arm F, and a slot and notch are made in said shoe, as at $e$, for the sickle-bar and sickle to work in, in the usual way. There is also another hinged coupling-arm, H, at right angles to that E, which is pivoted at $f$ to lugs on the arm F, and also to a hanger underneath the rear portion of the main frame. These two coupling-arms, while allowing the platform to yield to the inequalities of the ground, keep it in proper working position and advance it over the ground.

To prevent the platform from dropping too far the coupling-arm H is suspended from the main frame by a cord or chain, $g$, which will allow the platform to freely rise, but control the extent of its descent.

The reel-post I is placed on the end of a short shaft, $h$, which, in turn, is connected to the end of the axle B by a toggle-joint, $i$, so that it may yield to the motions of the machine. On this short shaft $h$ there is a pulley, $j$, around which, and around a pulley, $k$, on the reel-shaft $l$, passes an endless band to give motion to the reel J.

The reel-post I is braced by a brace, K, which is adjustable, so as to move the reel-post and reel farther forward or back, as the condition of the crop to be cut may require. This adjustability is by a series of bolt-holes at $m\ n$ at the bottom and top of the brace. The reel-post is faced with metal, so that the slide $o$, which carries the reel-shaft supporter $p$, may have a firm bearing thereon, and the slide is connected to a cap, $q$, by a screw-rod, $r$, so that it, and consequently the reel, may be raised and lowered on the reel-post at pleasure. The bracket $d$, in or against which the front part of the shoe F moves, also holds the plate $m$, by which the lower end of the brace K is held and adjusted, and to give it sufficient rigidity to afford these supports the said bracket is strengthened by a tie or tie and brace rod $s$, extending from the point $a$ and secured to said bracket.

The platform, in addition to the ordinary grain-side supporting-wheel, has another supporting-wheel, L, near its delivery side and in rear. This wheel L can be set forward or back on the arm $t$, and the platform can be raised or lowered on the shank of this supporting-wheel by means of the socket $u$ and set-screw $v$, the object and purpose of this adjustment being to regulate the height of the platform above the ground.

On the platform side of the outside divider there is a hinged wing, M, that can be adjusted by means of a set-screw, w, its object being to properly guide the grain as it falls onto the platform, and so that the rake may take it and carry it around to where it is pressed into a gavel and then delivered on the ground.

A rake, N, is caused to sweep the grain from the platform and aid in pressing it into a gavel before it finally sweeps it off from the grain-table and delivers it upon the ground in a gavel.

This rake is driven and operates as follows: A beveled-spur gear, $x$, on the main axle, through a similar spur-gear, $y$, on a shaft, $z$, gives motion to said shaft when the clutch 1 is thrown in by the foot and hand (one or both) lever 2. To the rear of the shaft $z$ is connected, by a yielding or universal joint, 3, another shaft, 4, which is also similarly jointed to another shaft, 7, which extends outward and under the rear end of the platform, where it is supported, and has upon its extreme end a bevel-pinion, 5, that gears with and turns another bevel-pinion, 6, that operates the crank O, that, in turn, gives the rake N its sweep and elongated and contracted motions, as will be explained. A beam, P, extends out in rear of the platform, to which an upward-inclined bar, Q, is attached, and on the rear of this bar Q the rake-shank R is pivoted and supported. Besides the universal joints by which the shaft 4 is connected to the shafts $z$ and 7, there are slip-joints at 8 8, so that the platform and its portion of the shafting 7, and the main frame and its portion of the shafting $z$, may have free rising and falling motions independent of each other, while the intermediate shaft 4, which connects with the two others, may accommodate itself to and compensate for the motions of the others.

I have designated the rake-shank by the letter R and the rake by the letter N. There is an intermediate piece between and connected to these two pieces, which I call the "rake-head S." The rake-shank R moves in a circle of which the end of the bar Q is the center.

The rake-head S has a sliding or reaching motion on the rake-shank R, and the rake N has a sliding or reaching motion on the rake-head S, which I shall describe as follows: The rake-head S is pivoted to the crank-arm $o$ at 9; and when the crank-arm has passed its dead-point, which is in the line of the beam and bearer P Q, or has reached—say the dotted red line at $z'$—then the rake-head S and the rake N begin to slide on the shank R and reach out toward the front of the platform and close to the outside divider and under the wing M thereof, and continues to do so until a pivoted lever, 10, on the rake-head S comes against a projection, 11, on the rake-shank, which causes said lever to turn on its pivot. Now, one arm of this pivoted lever 10 is united to the rake N by a link or rod, 12, and when this lever swings, by coming against the projection 11 it moves the rake proper outward on the rake-head S, and this reaching motion of the rake proper and the rake-head continue until the rake has reached the front of the platform or cutting apparatus, and begins to sweep it of the cut grain. From this point the motions of the rake-head and rake are such as that the rake may keep close to the line of cutters, and until by the sweep of the crank O they are moved backward again, and when the rake arrives at the point where it is shown in red lines its parts and connections will have assumed the positions there shown.

To the side of the rake-head S there is hinged a palm or wing, T, and when the end U of the crank or arm O comes against this wing it moves it against the action of a spring, 13, into the position shown by the red lines in Fig. 2; the object of this being to compress the grain which has been swept around against the compressor or fence V, and had the heads of the stocks partially turned thereby into a compact gavel and then swept off onto the ground at the delivery-point W. As the arm O leaves the wing T the latter is drawn close into the rake-head by the reaction or recoil of the spring 13.

To guide the rake proper in its reaching-movement upon the rake-head, it is united thereto by slots 14 and set-screws 15. On the end of the rake-shank R there is a stop, 16, which, when the shoulder 17 comes up to it, stops any further motion of the rake upon its head; but the head itself continues to move outward so as to be in position to help form the gavel.

There is a friction-roll, 18, on the arm $o$, which runs upon a portion of the platform 19 that is lower than the front portion where the grain falls. This rear portion is lowered so that the arm $o$ may swing in it and allow the rake to come close down to the grain-table.

Having thus fully described my invention, what I claim, and desire to secure by Letters Patent, is—

1. In combination with a rake-shank having a horizontal circular motion, a rake-head and rake united therewith, so that the rake-head and rake, in addition to their circular motion with the shank, may have a reaching or forward and backward sliding motion independent of the shank, and with and independent of each other, substantially as described and represented, and for the purpose set forth.

2. In combination with a circular and reaching rake, a palm or compressor which is swung out to aid in gathering the gavel into a compact form before it is delivered upon the ground, substantially as described.

3. In combination with the angular arm $o$ for operating the rake, the lowering or recessing of the rear portion of the platform, so that the arm may turn freely and allow the rake to work close to the platform, as described,

HENRY FISHER.

Witnesses:
ISAAC HAZLETT,
ED. F. SCHNEIDER.